Jan. 7, 1941.   C. G. OLSON   2,228,217
LOCK WASHER
Filed Oct. 25, 1937   2 Sheets-Sheet 1
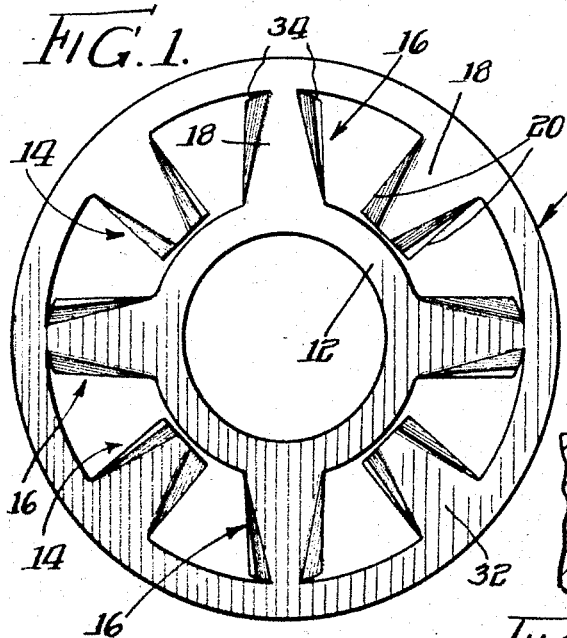
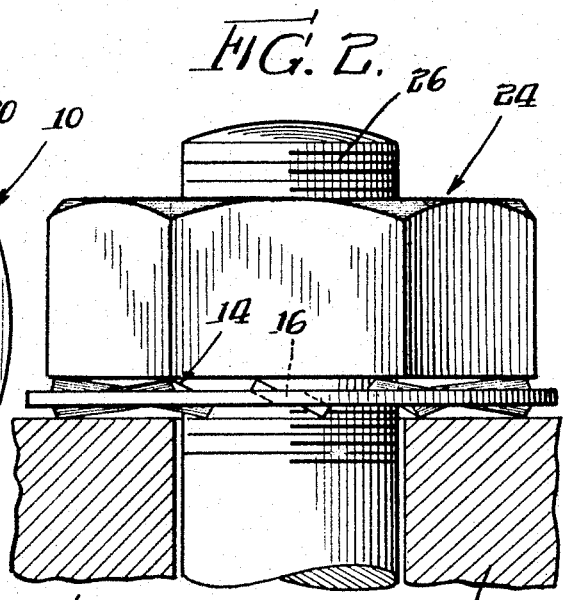
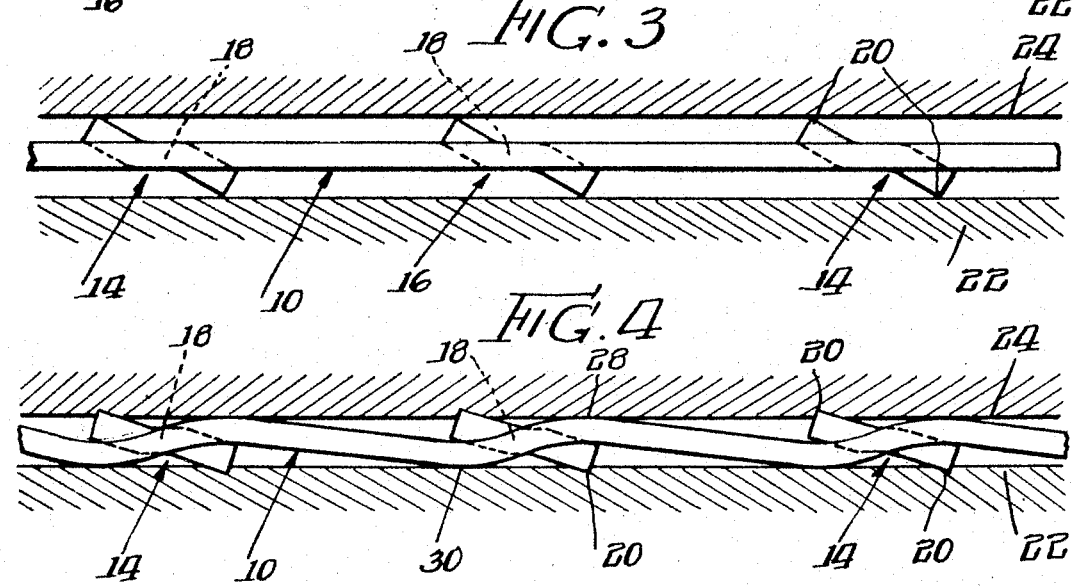
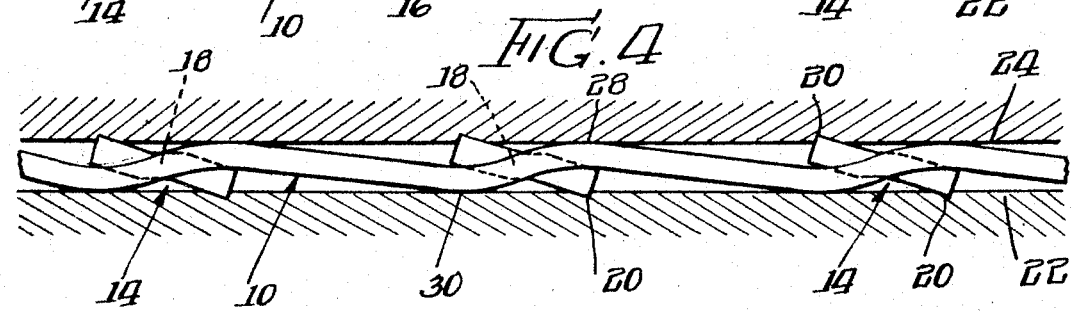
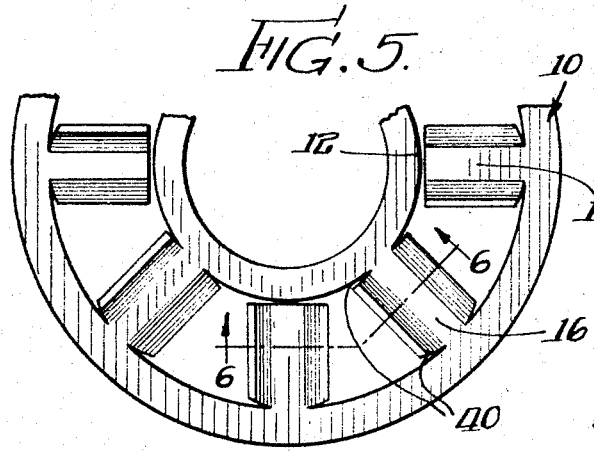
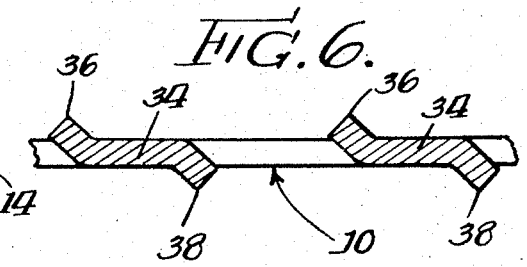
Inventor
Carl G. Olson
By:- Cox & Moore attys.

Jan. 7, 1941. C. G. OLSON 2,228,217
LOCK WASHER
Filed Oct. 25, 1937 2 Sheets-Sheet 2
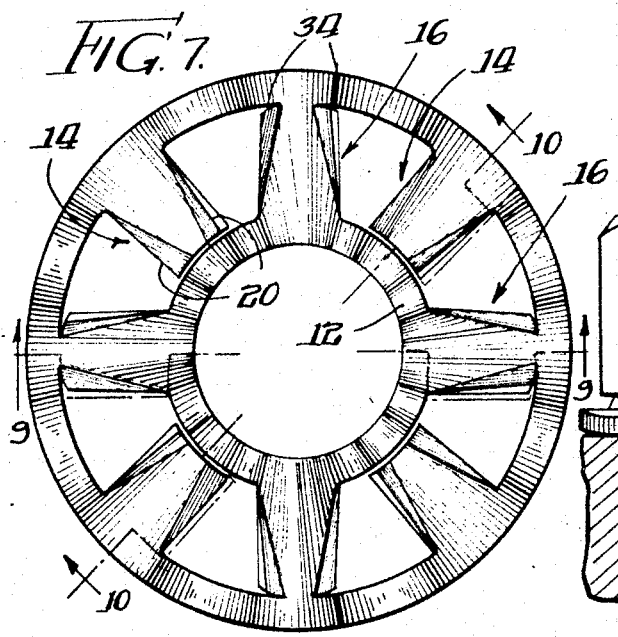
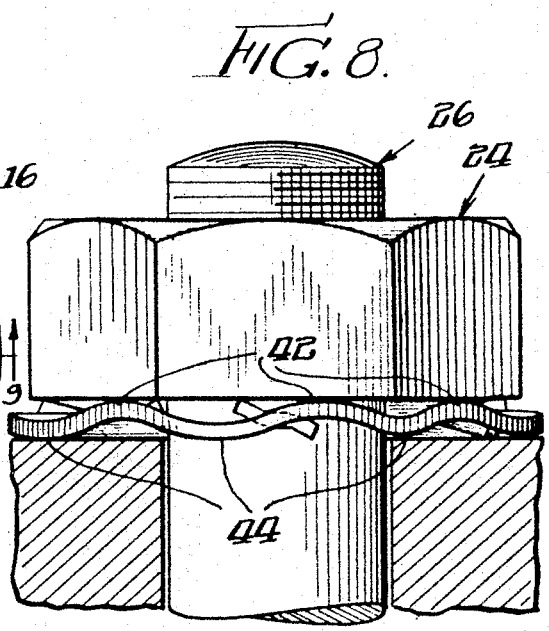
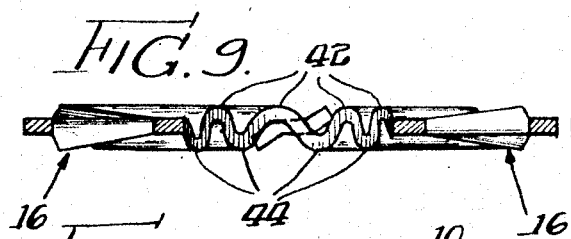
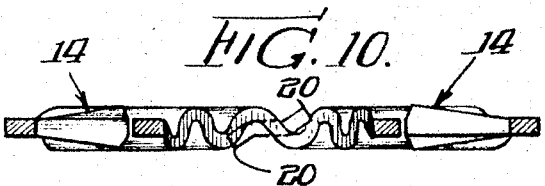
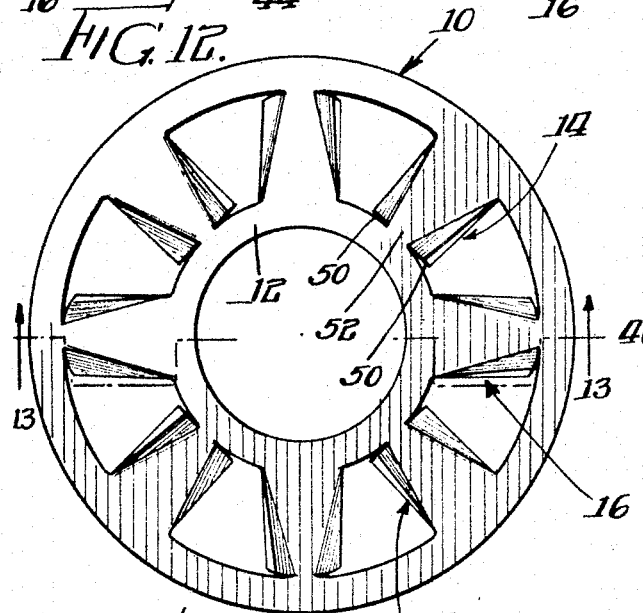
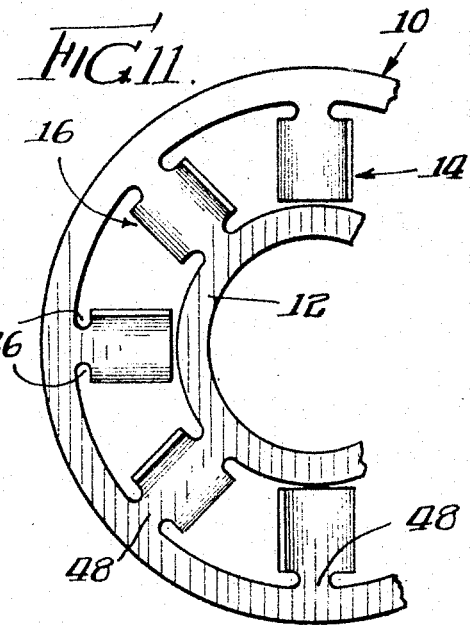
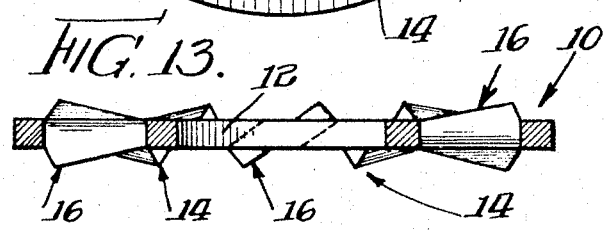
Inventor
Carl G. Olson
By:- Cox & Moore
Attys.

Patented Jan. 7, 1941

2,228,217

UNITED STATES PATENT OFFICE 2,228,217

LOCK WASHER

Carl G. Olson, Chicago, Ill., assignor to Illinois Tool Works, Chicago, Ill., a corporation of Illinois Application October 25, 1937, Serial No. 170,794

11 Claims. (Cl. 151—35)

The present invention relates to a lock washer and more particularly to lock washers having a plurality of work engaging teeth.

One of the primary objects of the present invention is to provide an improved lock washer having prongs with work engaging teeth, which prongs are associated with an annular body portion so that the resilient spring action of the body cooperates with the prongs to cause the teeth to engage the work pieces in a new and improved manner.

Lock washers employing twisted or bent prongs having oppositely disposed tooth portions for strutting engagement with the work pieces depend in large measure for their locking action upon the resilient forces tending to maintain the tooth portions in contact with the work and available at all times to produce a locking or strutting action. The twisting or rotational distortion of the teeth, under the influence of clamping together the opposed work pieces, tends to distort the body portion of the washer. In many cases, particularly when the prongs are supported from an inside annular ring member, the body sections of the ring member between the prongs are exceedingly short and do not readily yield to action such as would cause the teeth to engage into the work piece.

It is therefore a purpose of the present invention to provide an improved lock washer having inner and outer annular body portions so configurated as to render available an improved resilient spring action therein tending to urge the prongs into locking engagement with the work piece.

An additional object of this invention is to provide an improved lock washer having annular body portions to which are secured locking prongs having teeth thereon wherein the prongs are so spaced with relation to the body portions at their points of attachment thereto that an improved, intensified flexing effect is obtained.

Another object of the present invention is to provide a lock washer having inner and outer annular body portions with radially extending prongs attached integrally thereto and being so spaced as to produce resilient body sections cooperating to flex the prongs at either end in a direction reverse to the direction of the twist induced by clamping between work pieces.

Yet an additional object of the present invention is to provide a lock washer the same as above but wherein the prongs are secured to both the inner and outer annular body portions at substantially the same spacing so as to produce substantially the same resilient locking action upon either end thereof.

A still additional object of the present invention is to provide a lock washer the same as above having radially extending prongs attached to both inner and outer annular body portions and spaced from the adjacent prongs such a distance as to provide a resilient body section cooperating to urge the prong into locking relationship, certain additional prongs being integrally secured to the outer annular body portion whereby to take advantage of the additional available flexing effect due to its increased length, said additional prongs being free, or substantally free, from attachment to the inner annulus or else capable of being readily separated therefrom under the influence of severe twisting so as to prevent hindrance with the proper flexing of the inner annular body member.

It is another object of the present invention to provide a locking washer, as above, which provides an improved locking action when used with a comparatively small nut or fastener by providing teeth extending outwardly from an inner rim for exerting a maximum locking action, and additional teeth free from the inner rim but extending inwardly from an outer rim which will be additionally warped thereby, so that said additional teeth cooperate to provide improved points of interlocking contact.

A yet further object of the present invention is to provide a lock washer having prongs with inclined engaging teeth thereon, the teeth on alternate prongs being inclined in opposite radial directions in order to distribute the locking engagement radially and symmetrically with respect to the work pieces.

The foregoing and other objects will be apparent from the following detailed description considered in connection with the accompanying drawings, wherein:

Fig. 1 is a plan view of a washer constructed in accordance with the present invention.

Fig. 2 is a sectional elevation through a work piece and a bolt showing the washer of Fig. 1 in operative position with respect thereto.

Fig. 3 is developed elevation illustrating the position of the above washer between the work pieces.

Fig. 4 is a view the same as Fig. 3 but showing the configuration of the lock washer under the influence of increased compressive stress.

Fig. 5 is a partial plan view showing an alternative preferred embodiment constructed in accordance with the present invention.

Fig. 6 is a detail sectional elevation taken on the line 6—6 of Fig. 5.

Fig. 7 is a plan view of a yet further alternative preferred embodiment of the present invention.

Fig. 8 is a sectional elevation of a work piece and bolt showing the application of the washer of Fig. 7.

Fig. 9 is a sectional elevation taken on the line 9—9 of Fig. 7.

Fig. 10 is a sectional elevation taken on the line 10—10 in Fig. 7.

Figs. 11 and 12 are plan views of further alternative preferred embodiments.

Fig. 13 is a view taken on the line 13—13 in Fig. 11.

Referring now to Figs. 1 and 2 of the drawings more in detail, wherein similar numerals have been employed to designate corresponding parts of the various figures, it will be seen that one embodiment of my invention comprises a lock washer which includes an outer annular body portion 10 and an inner annular body portion 12 separated by an annular space in which are arranged a plurality of substantially radially extending prongs 14 and 16. Each of the prongs includes a body portion 18 arranged substantially in the same plane as the plane of the annular body portions having work engaging edges or teeth 20 disposed on opposite sides thereof. These work engaging edges or teeth are formed by oppositely twisting the side edges of the prongs.

It is to be noted that the twisted or tooth portions progressively change in their effective width along their length. For example, the prongs indicated by the numeral 14 are formed of substantially the same transverse width of material but the twisted or tooth portions 20 are of a maximum width at their inner ends. The alternate prongs 16, on the other hand, are provided with twisted edges to form teeth 20, which increase in width toward the outer annular ring 10 and thus the teeth on each prong are inclined with respect to the normal plane of the lock washer, the teeth of each alternate prong being inclined in opposite directions.

The action of this lock washer thus will be clearly apparent after a reference to Fig. 2 wherein there is shown a work piece 22 having a bolt 26 passing therethrough to which is secured the nut 24. The washer previously described is arranged in operative position between the lower surface of the nut 24 and the work piece 22. It will be apparent that the raised edges of the inclined teeth will come first in contact with the adjacent surfaces of the work piece and the nut and, in spite of varied degrees of pressure which might be applied through the agency of the nut 24, these raised portions of the teeth will tend to engage into the adjacent work surfaces and to exert a strutting action against retrograde movement of the nut.

Thus, as shown clearly in Figs. 1 and 2, the tooth edges of the prongs 14 will engage the work piece 22 on the nut 24 adjacent the inner annular body member 12 while the tooth portions of the alternate prongs 16 will engage the work members in an annular line spaced radially from the aforementioned points of contact and near the periphery of the nut. This alternate arrangement of the toothed prongs accordingly assures the engagement of the teeth adjacent the bolt as well as removed radially therefrom in the vicinity of the periphery of the nut, as a result of which the locking action will be relatively symmetrically and regularly distributed with respect to the area of the opposed clamping faces.

In order to more clearly understand the function of the present type of lock washer, reference is made more specifically to Figs. 3 and 4, indicating the effect of clamping this member between opposed surfaces. Before the nut has been tightened to create any appreciable stress, the lock washer will have substantially the undistorted appearance indicated in Fig. 3. Application of a clamping force obviously tends to untwist the prongs 18, that is to rotate them slightly in a counterclockwise direction as viewed in these figures. Since the prongs disclosed are integrally attached to the outer annular body portion 10 over a substantial circumferential distance, the adjacent section of the body member is likewise distorted in a counterclockwise direction and when the prongs are spaced in the manner indicated in the figures there is produced in the body section a series of waves or resilient undulations.

It will be apparent that these undulations will at all times result in a resilient reaction in a clockwise direction tending to urge the locking teeth into biting engagement with adjacent work surfaces. Moreover it will be seen that when the lock washer has been distorted to the shape indicated at Fig. 4, the ridges 28 formed by the undulations will tend to come into contact with the lower face of the nut while the depressed portions 30 of the undulations as viewed in the figures and will similarly and symmetrically contact the adjacent surface of the work piece 22.

At this point the resistance to the further compression is sharply increased, since the body portion between the points 28 and 30 exerts a strutting action under further compression in an opposite direction to that of the teeth 20.

It will be apparent that if the nut could be tightened to the extent that the entire washer was confined within the normal planes of the body portion, then the teeth portions would become dislodged from the work pieces and the effectiveness of the device would be lost. According to the present invention the cooperation between the undulations of the body portion and the strutting action of the opposed teeth of the prongs serves to prevent such an excessive tightening of the nut against the washer and accordingly increases the carrying capacity of the present element.

The formation of resilient undulations of the character herein described will be prevented if the prongs are insufficiently spaced along the body member to which they are attached. Ordinarily when the prongs are situated so that they radiate inwardly from an outer annular body member, the proper spacing involves little difficulty. On the other hand when the teeth are formed upon the inner annular ring and radiate away from the ring, the body sections between the teeth tend to become quite short and do not yield to the above undulating action.

Attention is specifically directed to the fact that the prongs 14 (shown in Fig. 1) are attached only to the outer annular ring 20, being slit, or completely severed from the inner body member 12. As a result of this arrangement, the prongs 16 are integrally attached to both the inner and outer body members, while the prongs 14 are integrally attached only to the outer member 10. The result is that the points of integral attachment of all the adjacent prongs to their supporting body portions are substantially equally spaced along the annular body members and this distance of spacing is substantially the same with respect to the inner annular member 12 as to the outer annular member 10.

In accordance with the present invention the spacing of the teeth along the body member to which they are attached is such as to take advantage of the above described resilient twisting reaction. Accordingly it will be evident that the prongs 16, which are integrally attached to both the inner and the outer annular body members, will be doubly effective in that the resilient action of the annular body sections to which they are attached will be applied at both ends of the axis. On the other hand the prongs 14 will be subjected to the influence of the undulated body section of the outer ring 10 only. While the prongs 14 are thus relatively imperfectly supported, nevertheless they do not interfere with the resilient action of the inner annular body member 12 as they would if attached securely thereto.

Attention is directed to the fact that all of the prongs have a tapered body portion due to the fact that the teeth 20 increase in width toward one end thereof. As a result the prongs 14 are attached to the outer annulus 10 integrally along a distance corresponding to the greatest transverse width of the teeth, viz., the root of the prong as indicated by the numeral 32. Thus attachment at the root portion of the prong assures that the resilient twisting action induced by the adjacent body section will be effectively transmitted to the teeth of the prong. The root portion of the prong 16, on the other hand, is integrally secured to the inner annulus 12 while the outer edges are partly severed from the outer annulus 10 in order to permit twisting of the tooth portions.

It will be apparent from the above disclosure that the present invention comprehends the employment of any suitable number of prongs which will permit the novel cooperative resilient action of the body sections and accordingly, while the embodiment above described discloses eight prongs, it will be evident that the exact number may be varied in accordance with the size and characteristics of the lock washer.

The alternative preferred embodiment disclosed in Figs. 5 and 6 comprehends the employment of outer and inner annular body members 10 and 12, to which prongs 14 and 16 are attached in substantially the above manner. This embodiment does not provide prongs progressively twisted, but (as shown in Fig. 6) the prongs are provided with a body portion 34 extending radially of the washer and having the side edges thereof bent reversely to form on opposite sides thereof the locking teeth or edges 36 and 38. The prongs 16 adjacent both ends are slit partially from the body members (as shown at 40) to permit the distortion of the tooth portions 36 and 38. The prongs 14 are spaced from the inner annular body member 12 by the removal of metal from therebetween. Accordingly the prongs 14 will be subject to a resilient reaction of the outer annular body member while the prongs 16 will, in the above described manner, be subjected to a normal reverse twisting action at both ends when in use.

The preferred embodiment disclosed in Figs. 7 to 10, inclusive, differs from the first described embodiment in that the washer is initially formed with a series of undulations, as is clearly apparent from the spaced, elevated, radially extending ridges 42 in Figs. 8 and 9, and the intermediate depressed portions 44. It will be noted that the prongs 14 and 16 are arranged with respect to the undulations so that the body portions will tend to set up the above reverse twisting stress in the teeth and furthermore so that the body portions and adjacent prongs will tend to produce a strutting action in opposite directions when both are clamped between work pieces.

In other words, the teeth on the prong extend substantially transversely to the direction of inclination of the undulation to which the prong is attached, that is a line passing through the edges of the teeth 20, in Fig. 10, for example, extends across the inclined portion of the convolution to which the prong is integrally attached in a substantially transverse direction. Or, to express it in another way, the line between the prongs is inclined oppositely from the vertical to the inclination of the aforementioned portion of the convolution.

The washer disclosed for illustrative purposes in Fig. 11 is constructed similarly to the washer shown in Fig. 5, with the exception that a substantial amount of metal has been removed at the portions indicated by the numeral 46 so that the toothed prongs 14 and 16 are associated with the supporting annular body members by means of constricted neck portions 48 which resiliently transmit and convey stresses between said attached portions. The prongs also differ from those shown in Fig. 5 in that they are curved or twisted gradually into more of a reverse or S-curve instead of being provided with the sharply bent Z-shaped teeth as shown in Fig. 6.

The additional preferred embodiment of the present invention (shown in Figs. 12 and 13) is provided with annular body portions and teeth of substantially the same configuration as the washer in the initially described embodiment.

Referring to the vertical section, however, it will be apparent that the present washer is formed from a spring metal of relatively great thickness as compared with the previous embodiments, for reasons which will hereinafter appear. Moreover, the prongs 14 are not completely severed or slit from the inner body member 12 but are actually formed in integral attachment therewith, although the slits 50, extending between the aforesaid body member and the prong, extend toward the central portion thereof so that the area of attachment at the section 52 is considerably reduced. As in the first described embodiment, the prongs herein shown are provided with twisted teeth portions, the twist gradually and progressively diminishing toward one end. Accordingly, when placed between work pieces under considerable stress, the relatively thick, heavy prongs will tend to be "untwisted" thereby resiliently twisting the adjacent annular body sections. It has been found, however, that when the teeth 14 are twisted to any substantial extent with respect to the inner annular body member 12, they will break off and sever themselves therefrom. Accordingly the present embodiment provides a washer characterized by substantially the same novel and improved result previously described.

The present invention provides a washer having annular body portions which cooperate with the twisted teeth to provide a resilient bearing for the nut and the work while the teeth, together with the said annular body portions or not desired, act as struts for carrying the load. The engaging portions of the prong and the adjacent body portions thus are inclined in opposite directions with respect to the application of the force by the work piece.

Changes may be made in the form, construction and arrangement of the various parts without departing from the spirit of the invention or sacrificing any of the advantages, and the right is hereby reserved to make such changes as fairly fall within the scope of the following claims.

The invention is hereby claimed as follows:

1. A washer formed of thin, flexible spring stock and comprising an inner annular body portion, an outer concentric body portion spaced therefrom, a plurality of prongs arranged between the said body portions and substantially in the plane thereof, and having oppositely disposed work engaging teeth thereon, said teeth being inclined with respect to the said plane and increasing progressively in distance therefrom longitudinally of the prong, the teeth on certain prongs being oppositely inclined with respect to the center of the lock washer so that they increase in distance from the said plane in a direction outwardly of the center of the washer, the teeth on alternate prongs increasing in distance from the said plane in a direction toward the center of the washer whereby to engage the work piece at radially spaced sections.

2. A lock washer having a plurality of generally radially extending, annularly disposed prongs, work engaging teeth on opposite sides of said prongs, said teeth being inclined with respect to the plane of the washer and increasing progressively in distance therefrom longitudinally of the prongs, the teeth on certain prongs being oppositely inclined with respect to the center of the lock washer so that they increase in distance from the said plane in a direction outwardly of the center of the washer, the teeth on intermediate prongs increasing in distance from the said plane in a direction toward the center of the washer whereby to engage the work piece at radially spaced sections.

3. A lock washer of the stamped sheet, spring steel type having radially spaced inner and outer annular body members arranged in substantially the same plane, each of said annular body members having inner and outer circular margins, resilient prongs extending between the said annular body members and being twisted about their radial axis to provide opposed work engaging teeth, and a plurality of said prongs having free inner extremities, intermediate prongs being integrally joined with said inner and outer body members at their radial extremities, the prongs joined with the inner body member being twisted in a clockwise direction with respect to the said body member and the other prongs being twisted in an anti-clockwise direction with respect to the outer annular body member.

4. A lock washer formed of thin, flexible spring stock and having an outer annular body member and a radially spaced inner annular body member, prongs arranged in the space between said annular body members, each prong being integrally joined to an adjacent body member along a base portion of the prong, the radial axial portion of each prong residing substantially in the plane of the body members, material of the prongs on either side of said axis being twisted oppositely out of said plane to provide a prong adapted to untwist when tightened between work pieces for producing an undulation in the body portion to which the said prong is joined, a plurality of said prongs being attached to both body members and intermediate prongs being attached to the outer annular body member only.

5. A lock washer having an outer annular body member and an inner radially spaced annular body member, prongs arranged between said annular body members, each prong being integrally joined to an adjacent body member along a base portion of the prong, the radial axial portion of each prong residing substantially in the plane of the body members, material of the prongs on either side of said axis being twisted oppositely out of said plane to provide a prong adapted to untwist when tightened between work pieces for producing an undulation in the body portion to which the said prong is joined, a plurality of said prongs being attached to both body members and intermediate prongs being attached to one annular body member only, the spacing of the points of attachment of the prongs to the body members being substantially equal on the inner and outer body members.

6. A lock washer formed of thin, flexible spring stock and comprising a pair of spaced, concentric, annular body members, a plurality of prongs extending generally radially between said body members, each prong having work engaging teeth thereon extending oppositely out of the central plane of the washer and being adapted to cause the said prong to untwist about its radial axis when the washer is clamped between work pieces, alternate prongs being integrally secured at their end portions to both of said body members, intermediate prongs being integrally secured to the outer annular body member only.

7. A lock washer formed of thin, flexible spring stock and comprising a pair of concentric body members having an annular space therebetween, a plurality of generally radially extending prongs arranged between said body members and having oppositely disposed work engaging teeth thereon, said prongs being adapted to be deflected rotationally about the axes of the prongs when compressed between work pieces, alternate prongs being integral at opposite ends with both of said body members to convey said twisting strain thereto in order to produce resilient undulation of the body members, intermediate prongs being integrally attached at one end to said outer body member only and being substantially free from the central annular body member under the influence of any substantial relative twisting force.

8. A lock washer comprising a pair of concentric, spaced annular body members having a plurality of radial prongs extending therebetween and integrally connected at points of permanent attachment to provide a unitary, integral washer, said prongs each having oppositely disposed work engaging edges of such form as to bring about undulation of the body portions carrying them when clamped between work pieces, said points of permanent attachment being spaced a substantially equal distance on both the inner and outer members, the peripheral spacing being sufficient to accommodate undulations of substantially equal length in both the inner and outer body members set up by each attached prong in untwisting when the washer is tightened between work pieces.

9. A lock washer comprising a pair of concentric, spaced body members having a plurality of radial prongs extending therebetween and integrally connected at points of permanent attachment to provide a unitary, integral washer, said points of permanent attachment being spaced a substantially equal distance on both the inner and outer members, the peripheral spacing being sufficient to accommodate the individual undulation set up by each attached prong in untwisting when the washer is tightened between work pieces, said lock washer having additional points of tooth attachment adapted to become mechanically disconnected under the influence of a substantial, relative twisting stress.

10. A lock washer formed of flexible spring stock and comprising a pair of spaced concentric body members having a plurality of radial prongs extending therebetween, said body members being provided with permanent annularly extending undulations, each undulation comprising a pair of inclined sections oppositely inclined with respect to the plane of the washer, each of said locking prongs extending radially from said body portions and having root portions integrally joined with one of said inclined sections between the extremities of said section, each prong having opposite lateral marginal portions circumferentially opposite said inclined section extending oppositely out of the plane of said inclined section and terminating in a pair of opposed strutting locking teeth disposed in a plane oppositely inclined with respect to the plane of said section.

11. A lock washer formed of flexible spring stock and comprising an annular body portion, said annular body portion being provided with permanent annular undulations, each undulation comprising a pair of oppositely inclined sections, a locking prong extending radially from said body portion and having a root integrally joined with one of said inclined sections between the extremities of said section, each said prong having opposite lateral marginal portions circumferentially opposite one of said sections, extending oppositely out of the plane of said inclined section and terminating in a pair of opposed strutting locking teeth disposed in a plane oppositely inclined with respect to the plane of said section.

CARL G. OLSON.